(12) United States Patent
Zarges et al.

(10) Patent No.: US 8,530,530 B2
(45) Date of Patent: Sep. 10, 2013

(54) NON-AGGLOMERATING MIXED BED ION EXCHANGERS

(75) Inventors: Wolfgang Zarges, Cologne (DE); Stefan Hilger, Neunkirchen-Seelscheid (DE); Pierre Vanhoorne, Monheim (DE); Hans-Jurgen Wedemeyer, Leverkusen (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 13/093,150

(22) Filed: Apr. 25, 2011

(65) Prior Publication Data

US 2011/0278493 A1 Nov. 17, 2011

Related U.S. Application Data

(63) Continuation of application No. 11/824,898, filed on Jul. 3, 2007, now abandoned.

(30) Foreign Application Priority Data

Jul. 8, 2006 (DE) .......................... 10 2006 031 671

(51) Int. Cl.
*B01J 49/00* (2006.01)
*B01J 41/12* (2006.01)
*B01J 39/20* (2006.01)
*C08J 5/20* (2006.01)
*C02F 5/10* (2006.01)

(52) U.S. Cl.
USPC .................. 521/28; 521/26; 521/30; 521/33; 252/179

(58) Field of Classification Search
USPC ..................... 521/28, 26, 30, 33; 252/179
See application file for complete search history.

(56) References Cited

U.S. PATENT DOCUMENTS

| 2,961,417 | A | | 11/1960 | Small |
| 3,168,486 | A | | 2/1965 | Small |
| 4,325,890 | A | | 4/1982 | Reitz et al. |
| 4,347,328 | A | | 8/1982 | Harmon et al. |
| 5,532,279 | A | | 7/1996 | Barretto et al. |
| 5,888,400 | A | * | 3/1999 | Tholema et al. .............. 210/644 |
| 5,902,833 | A | | 5/1999 | Tasaki |
| 6,060,526 | A | * | 5/2000 | Tasaki .............................. 521/28 |
| 6,255,366 | B1 | | 7/2001 | Adams et al. |

FOREIGN PATENT DOCUMENTS

| EP | 0037250 | 10/1981 |
| EP | 1291083 B1 | 10/2004 |
| FR | 1184632 | 7/1959 |
| JP | 200235607 A2 | 2/2002 |
| JP | 2003181303 A2 | 7/2003 |
| WO | WO0011115 A1 | 3/2000 |
| WO | WO03036742 A2 | 5/2003 |

OTHER PUBLICATIONS

European Search Report from co-pending Application EP07110689 dated Oct. 26, 2010, 6 pages.
Cytec Technical Bulletin, Specialty Additives—Aerosol OT Surfactant—Mold Release Agent for Methacrylic Polymers (PMMA), www.cytec.com, Jan. 4, 2010 Edition, (16 pages).

\* cited by examiner

*Primary Examiner* — Michael M Bernshteyn
(74) *Attorney, Agent, or Firm* — Nicanor A. Kohncke

(57) ABSTRACT

The invention relates to a process for producing non-agglomerating mixed bed ion exchangers or mixed bed components.

11 Claims, 3 Drawing Sheets

NON-AGGLOMERATING MIXED BED ION EXCHANGERS

CROSS REFERENCE TO RELATED PATENT APPLICATIONS

This application is a continuation of U.S. patent application Ser. No. 11/824,898 filed Jul. 3, 2007, pending, which claims the right of priority of German Patent Application No. 102006031671.1 filed on 8 Jul. 2006.

The invention relates to a process for producing non-agglomerating mixed bed ion exchangers or mixed bed components.

BACKGROUND OF THE INVENTION

The use of mixed bed ion exchangers is prior art in the desalting of aqueous solutions. Surface interactions between the cationic and anionic components of the mixture lead to the formation of agglomerates ("clumping") and thereby to poor flow behaviour. Furthermore, the performance of such mixed beds is unsatisfactory. In addition the agglomeration prevents effective regeneration of the ion exchange resins for which the mixture must be fractionated as completely as possible into its components.

To prevent the unwanted clumping in mixed beds, diverse methods have been described such as, for example a) the treatment with water-insoluble ion exchange particles in U.S. Pat. No. 4,347,328 where high amounts used and high washwater volumes are required in order to remove excess ion exchange particles again or else b) the treatment with watersoluble resinous polyelectrolytes according to U.S. Pat. Nos. 2,961,417, 3,168,486, 5,902,833, 6,060,526 or EP-A 1 291 083. The water-soluble polyelectrolytes for treating the anion exchange component are water-soluble resinous polyelectrolytes such as polymeric acrylic or methacrylic acid (derivatives), but preferably sulphonated polyvinylaromatics, and very particularly preferably polystyrenesulphonic acid (PSS). Depending on the mean molar weight of the PSS, optimum amounts used can be determined according to diverse criteria. For mean molar weights of 5000 to 1 000 000 g/mol, the preferred amounts used are in the range from 10 to 800 mg/liter of anion exchanger.

Separability of the mixed beds, however, is only achieved on simultaneous treatment of the cation exchange component as described, for example, in EP-A 1 291 083. In this case also, use is made of water-soluble polyelectrolytes, for example polyvinylaromatic quaternary ammonium salts, polyvinylaromatic amino acid salts and polyvinylpyridinium salts having mean molar weights of 5000 to 1 000 000 g/mol.

The above processes all have the disadvantage that the polyvinylaromatic acids or ammonium compounds are only accessible in the suitable molar mass range with relative difficulty and that to achieve good separability in the mixed bed both charge components must be treated.

An object of the present invention was to overcome the described disadvantages.

DISCLOSURE OF THE INVENTION

A solution of the object and thus subject matter of the present invention is a process for producing non-agglomerating readily separable mixed bed ion exchangers or mixed bed components, characterized in that the anion exchange component, before or after mixing with the cation exchange component, is treated with a condensate of one or more aromatic sulphonic acids in the application concentrations of 10 mg/liter of resin to 100 g/liter of resin.

Surprisingly, the sole treatment of the anion exchange component according to the invention produces a non-agglomerating readily separable mixed bed having excellent desalting performance.

The process according to the invention provides solely treatment of the anion exchange component with oligomeric aromatic sulphonic acid condensates as are used, for example, as tanning agents and liquefiers. These sulphonic acid condensates are already disclosed by EP-A 0 037 250 or DE-A 2 934 980. Aromatic sulphonic acids in the context of this invention are also taken to mean sulphomethylated aromatics. Preferred sulphonated aromatics are: phenolsulphonic acid, sulphonated ditolyl ether, 4,4'-dihydroxydiphenylsulphone, sulphonated diphenylmethane, sulphonated biphenyl, sulphonated terphenyl, naphthalenesulphonic acids or benzenesulphonic acids. Further formulations for the composition of the claimed product group are described in EP-A 816 406, the contents of which are hereby incorporated by the present application. Condensation of the sulphonic acids proceeds in this case with aldehydes or ketones. Here, in particular aliphatic, cycloaliphatic and also aromatic representatives come into consideration. Preference is given to aliphatic aldehydes, with use being made particularly preferably of formaldehyde and also other aliphatic aldehydes having 3-5 carbon atoms.

These condensates are generally in the form of their alkali metal, alkaline earth metal or ammonium salts and are accompanied by "neutral salts" from synthesis-specific neutralization reactions. The use of these condensates can, but need not, proceed in the form of their low-salt formulations, the production of which is described, for example, in EP-A 0 816 406. Quite in contrast, salt additions can obviously improve the take-up behaviour of the condensates, which is demonstrated in measurably improved desalting performance (Example 5, FIG. 3). In a preferred embodiment, therefore salt is added to the anion exchange component, particularly preferably alkaline earth metal salts. Use is made particularly preferably of calcium chloride.

In the broader sense, the condensed aromatic sulphonic acids are also taken to mean ligninsulphonates and condensates thereof with aromatic hydroxyl compounds.

Ion exchange resins as are described in this invention are typically spherical polymer beads having a diameter of 0.15-1.20 mm, preferably having a diameter of 0.25-1.00 mm.

Of particular interest here are strongly acidic cation exchangers and strongly basic anion exchangers based on monovinylaromatics, preferably styrene, or alkyl-substituted offshoots which are copolymerized with crosslinkable monomers. As crosslinkers in this sense, use is preferably made of divinylbenzene (or alkyl-substituted related compounds), octadiene, trivinylcyclohexane and ethylene glycol-bridged divinyl ether or divinyl acrylates and divinyl methacrylates.

Particular preference is given to strongly acidic cation exchangers which are obtained by sulphonation from the abovementioned polymers and strongly basic anion exchangers having quaternary ammonium groups which were synthesized from the abovementioned polymers by aminomethylation (chloromethylation processes or phthalimide processes). It is of no significance here whether the abovementioned ion exchange resins are in the form of what are termed gel-like or macroporous (polymerization of the abovementioned starting materials in the presence of an inert solvent/precipitant) species. In addition, the activity is independent of the salt form of the anion exchange component to be treated (for example chloride, sulphate, hydroxide). Ion exchangers which are preferably to be treated by the process according to the invention are the following:

strongly acidic gel-type cation exchangers, for example LEWATIT® MonoPlus S 200 strongly acidic macroporous cation exchangers, for example LEWATIT® MonoPlus SP 112 strongly basic gel-type anion exchangers, for example LEWATIT® MonoPlus M 500 strongly basic macroporous anion exchangers, for example LEWATIT® MonoPlus MP 500

Particularly preferred representatives of said sulphonic acid condensates for the process according to the invention are the following:

RETINGAN® ZN, TAMOL® NN4501, TAMOL® NH7519—methylene-condensed naphthalene-sulphonic acid(s) [NSSK=naphthalenesulphonic acid condensates or NSS=methylene-condensed naphthalenesulphonic acid]

BAYKANOL® SL—methylene-condensed sulphonated ditolyl ether

TANIGAN® BN—methylene-condensed naphthalenesulphonic acid(s) and 4,4'-dihydroxydiphenyl-sulphone.

Preferably, according to the invention, the polyanionic component is applied to the anion exchanger in the batch.

Preferably according to the invention, in the production of mixed beds, the anion exchanger is treated before regeneration of the anion exchanger and before mixture with the cation exchange component. Alternatively, however, retrospective treatment is likewise possible.

According to the invention, very particularly preferably, as sulphonic acid condensates, use is made of methylene-bridged naphthalenesulphonic acids [NSSK]. Particularly preferably, the sulphonic acid condensates have a molar weight of >1000 g/l, preferably >5000 g/l and very particularly preferably >20 000 g/mol.

EXAMPLES

Example 1

The anion exchange resin to be treated (LEWATIT® MonoPlus M 500) was charged in a glass beaker with the specified amount of condensate as a 0.1% strength solution. The mixture was stirred for 20 min and then allowed to stand for a further 10 min. Thereafter it was dewatered and washed with 2 BV (bed volumes) of deionized water.

50 ml of the anion exchange resin thus treated were shaken under water on a vibrating bench to constant volume and mixed with the same volume (shaken under water) of a strongly acidic cation exchanger (LEWATIT® MonoPlus S 200) by stirring in a glass beaker. Subsequently the mixture was shaken under water on the vibrating bench. The volume of the mixture was determined. Results with different condensates in different application rates may be found in Table 1.

Example 2

The anion exchange resin to be treated (LEWATIT® MonoPlus M 500) was admixed in a glass beaker with 1.5 g/(liter of resin) of the NSS condensate 2, dissolved in demineralized water, with stirring. The mixture was then allowed to stand for 10 min. Thereafter it was dewatered and washed with 2 BV of deionized water. Regeneration proceeds via treatment with 300 g of NaOH 100%/l of resin as 5% strength solution which was passed through the bed.

250 ml of the anion exchange resin thus treated were shaken under water on a vibrating bench to constant volume and mixed with 160 ml (shaken under water) of a strongly acidic cation exchanger (LEWATIT® MonoPlus S 200) by stirring in a glass beaker. Subsequently the mixture was transferred to an exchange column and charged with 10 BV of drinking water.

By water flowing in at the column bottom, the bed was then extended for the regeneration to about three times its height. After approximately 2 min the flow of the influent water was continuously reduced to the value of zero. Thereafter, the column was carefully dewatered until just above the ion exchange bed. The anion exchanger was be seen at the top and the cation exchanger at the bottom. The volumetric fractions of the two were determined. An anion exchange fraction of 61% gave very good separation.

NSSK additions (1 g/l of anion exchange component) were introduced into the liquid standing over the mixed bed. The liquid level was then lowered again to the bed level. After 10 min, extension of the bed by water flowing in from the bottom began.

Example 3

The anion exchange resin to be treated (LEWATIT® MonoPlus MP 500) was charged in a glass beaker with 1.5 g/(liter of resin) of naphthalenesulphonic acid condensate 1 as 0.1% strength solution or with 1.25 g/(liter of resin) of sulphonated polystyrene (Versa® TL 130). The mixture was stirred for 20 min and then allowed to stand for a further 10 min. Thereafter it was dewatered and washed with 10 BV of deionized water.

Example 4

Test Structure

| Test volume | approximately 400 ml |
| Flow rate: | 270 g |
| | 28.5 BV |
| | 11.4 l/h |

Pretreatment of the samples from Example 3:

Regeneration with 300 g/l of HCl/NaOH 100%, when non-regenerated resin mixtures were tested. [KR/OH regeneration: NaOH—$H_2SO_4$—$NaHCO_3$—NaOH→degree of regeneration>90%]

In the case of complete mixtures, the resins must be thoroughly mixed before the start of the experiment.

Before the start of the test, the sample was washed exhaustively with 10 BV.

Measurement Instruments:

| Anatel ® 1000 | for total capacity |
| Thornton ® 770 PC | for resistance |

Test Steps:
1. Washing until maximum resistance value was achieved in the effluent (approx. 1 h)
2. Charging with raw water until breakthrough (<1 MΩ)

Washwater Quality:

| | |
|---|---|
| Resistance: | >18.2 MΩ |
| TOC: | 1-3 ppb |

Charging Water Quality:

| | |
|---|---|
| Conductivity: | 450-500 µS/cm |
| Salt content: | 5-6 meq/l |
| $SiO_2$ content: | 3-4 ppm |

The reduction in agglomeration is measurable using a conventional method as described in Example 1. A satisfactory degree of "non-agglomeration" is achieved when the combined (shaken) volumes of anion and cation exchangers after mixing is no more than 20%, preferably no more than 10%, and particularly preferably no more than 5%, above the total volume of the separated resins.

Results according to Example 1 are compiled in Table 1.

Example 5

600 ml samples of anion exchanger were each mixed with 600 ml of solution (a: demineralized water, b: 1% strength $CaCl_2$ solution in demineralized water) in a glass column and vortexed by air flowing in from the bottom. In the course of 45 min, 0.72 g of a 5% strength solution of the naphthalenesulphonic acid condensate 2 in demineralized water was added with vortexing (equivalent to 60 mg of NSSK2 per liter of anion exchanger). After addition was completed, vortexing was continued for a further 15 min. Thereafter the solution was allowed to drain out and the column was made up with demineralized water to 1 cm above the resin surface before charge exchange using 2400 g of sulphuric acid (3% strength). A neutral wash follows. Thereafter the charge was exchanged to the OH form using 2395 g of a 10% strength sodium hydroxide solution. Finally it was washed neutral and mixed for measurement with LEWATIT® MonoPlus S 200 KR (FIG. 3).

TABLE 1

Mixed bed agglomeration test according to Example 1. Mixture of LEWATIT ® MonoPlus M500 and LEWATIT ® MonoPlus S 200. The amount of condensates used is reported. The inorganic salt contained in the commercial products has not been taken into account.

| Additive name and application rate | Volume shaken |
|---|---|
| "Blank test" | 167 ml |
| Naphthalenesulphonic acid condensate 1 | |
| 0.50 g/liter of resin | 102 ml |
| 0.10 g/liter of resin | 101 ml |
| 0.05 g/liter of resin | 145 ml |
| Naphthalenesulphonic acid condensate 2 | |
| 0.10 g/liter of resin | 102 ml |
| 0.05 g/liter of resin | 102 ml |
| Sulphonated ditolyl ether sulphonated, condensed | |
| 0.50 g/liter of resin | 101 ml |
| 0.10 g/liter of resin | 103 ml |
| 0.05 g/liter of resin | 152 ml |
| Naphthalenesulphonic acid and 4,4'-dihydroxydiphenylsulphone co-condensed | |
| 0.50 g/liter of resin | 101 ml |
| 0.10 g/liter of resin | 140 ml |

For regeneration, the mixed beds must first be fractionated into the individual components. This generally proceeds by the means that water is injected into the exchange columns from the bottom. In the water stream, the components are ordered in accordance with their density: the anion exchanger is situated above the cation exchanger. The separation layer may be readily identified on the basis of the colour differences of the components. A precondition for as complete a regeneration as possible of the mixed bed (that is to say of its individual components) is good separation into anion exchange and cation exchange components. This separation, however, is virtually not achieved in the case of untreated starting materials and only inadequately in the case of anion exchange component treated in advance. If, then, before separation a small amount of the compounds of the invention is added, with mixing as is customary by injection of air or nitrogen, subsequently the mixed bed may be fractionated virtually perfectly into the individual components in the water upflow (Example 2).

In order to test the separability of the mixed bed, a method was employed in which the production of a mixed bed ion exchanger, its use for obtaining ultrapure water and subsequent separation of the mixed bed into its components in the upflow process is simulated (Example 2). In this process 61 parts of a strongly basic anion exchanger are mixed with 39 parts of a strongly acidic cation exchanger, transferred to a column and subsequently operated in the desalting mode for producing high purity water. After a certain running time, the components are separated from one another in the water upflow. The material is allowed to settle, dewatered and the visually recognizable percentage composition of the mixture is determined. Perfect separation is given by an anion exchange fraction of 61%. The results may be found in Table 2.

TABLE 2

Results of the mixed bed separation test according to Example 2

| Ser. No. | Cation exchanger | Anion exchanger | Additive before separation | Volume of the anion exchanger after separation |
|---|---|---|---|---|
| 1 | untreated | untreated | No | No separation |
| 2 | untreated | untreated | NSS Condensate 2 | 61% |
| 3 | untreated | NSS Condensate 2 | No | 25% |
| 4 | untreated | NSS Condensate 2 | NSS Condensate 2 | 60% |

Effect of Treatment on Mixed-Bed Performance

The loading of the anion exchanger in this case is without any adverse effect on the performance of the mixed bed produced correspondingly. Rather, in partial aspects, the performance is even improved (FIG. 1), and this also in comparison with a sample produced analogously to U.S. Pat. No. 5,902,833 (Example 3).

In addition to the important property of separability, preventing agglomeration has a considerable effect on performance of the resin mixture with respect to extractability and exchange kinetics. Clumping, even in the micro region, leads to channel formation in flow through the bed, that is to say individual regions of the resin bed, through which flow generally passes from top to bottom, are not wetted and thus do not participate in the exchange.

More serious than the channel formation is the material transfer which is produced by mechanical breakage, such as due to air vortexing or stirring of the clumping. Since the anion exchange component has the softer surface, generally anion exchange material is transferred to the cation exchanger. The longer and more serious is the action of the mechanical stress, the more material is transferred. Since the functional group of the anion exchanger is a cation, the surface of the cation resin becomes loaded with cations owing to the material transfer. This leads to a poorer mass transfer as a result of this covering layer which in turn has an adverse consequence on slip. The more strongly the covering layer is formed, the higher is the cation slip and the lower is the resistance of the solution in the effluent downstream of the resin mixture. This can only be counteracted by markedly reducing or even completely suppressing the clumping by a suitable coating.

The performance of a resin mixture is defined by the following measurable characteristics:
Resistance of the prepared water on washing
Resistance of the prepared water on loading
$SiO_2$ slip on loading
Usable capacity The 'usable capacity', expressed in eq/l, is a measure of the ion exchange capacity effectively available up to breakthrough for a defined endpoint, such as, for example, a minimum residual resistance of 17 MΩ. For this, the ion loading of the loading water in eq/l is multiplied by flow rate in l/h and the time up to breakthrough point in h. This gives the ion loading which is divided by the amount of resin in liters.

Figure 1:
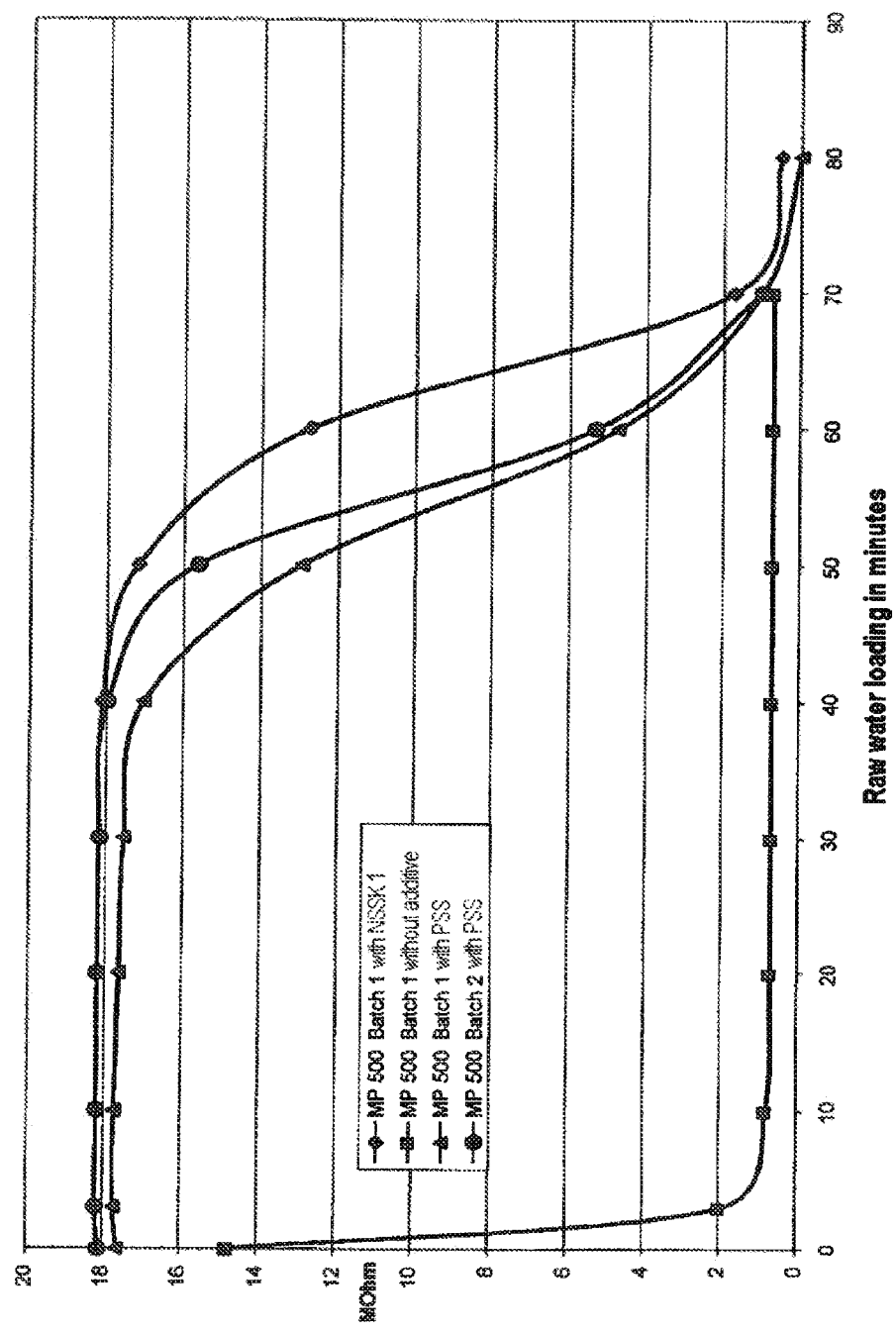
FIG. 1 plots the experimental results of differently treated resin samples.

FIG. 1 Presentation of the experimental results of differently treated resin samples including the blank sample (Example 3) and measurement according to Example 4; NSSK=naphthalene-sulphonic acid condensate, PSS=polystyrenesulphonic acid).

For identical parameters with respect to flow rate and ion loading of the raw water, as in the experiments in FIG. 1, the time to breakthrough can be used as a sufficient comparison index (experimental procedure Example 4).

FIG. 1 shows the results of a test series using LEWATIT® MonoPlus MP500, which was regenerated after treatment with NSSK or PSS with 300 g of NaOH 100%/l. Thereafter, it was mixed with an untreated cation component of the LEWATIT® MonoPlus SP112 H type in the ratio cations to anions 1:1.5. The cation exchanger, for better comparability, was provided in the regenerated form. For better comparability, resin samples of the same production batch were used.

FIG. 1 shows the capacity which is higher by orders of magnitude of the mixed beds produced with polyanion-occupied anion exchange components compared with the blank sample (magenta). The NSSK-treated sample has a higher capacity than that treated with PSS.

The untreated sample cannot be washed to values greater than 17 MΩ (starting point of the graph at 0 min). The sample treated with NSSK 1 may be washed to the theoretical resistance of pure water of 18.3 MΩ. The PSS-treated samples likewise achieved an acceptable level.

On loading, again the NSSK 1-treated sample achieved the best performance, with respect to the longest time to the breakthrough point of 17 MΩ.

The untreated sample was too poor kinetically to reduce the salt content to a sufficient extent.

Figure 2:
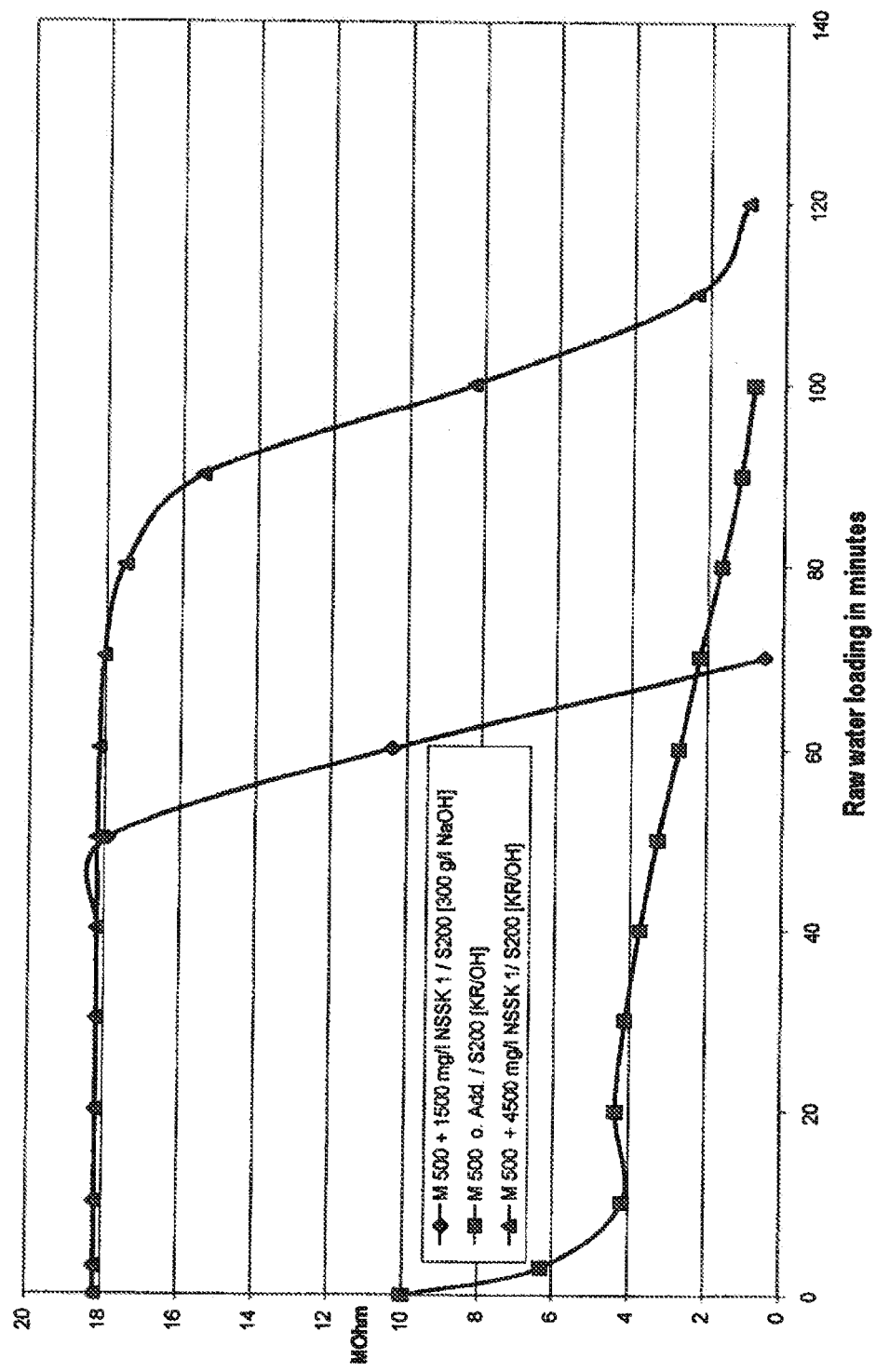
FIG. 2 plots the experimental results of differently treated resin samples.

A similar picture results in the study of gel-type mixed bed exchangers (FIG. 2). The untreated sample is too poor in the mixed bed to be able to decrease the salt content sufficiently. The treated samples reach the required resistance values. The differing usable capacities result from regeneration processes of differing effectiveness (Example 4).

FIG. 2 Presentation of the experimental results of differently treated resin samples of the same batch LEWATIT® MonoPlus M 500 in a mixed bed with LEWATIT® MonoPlus S 200 KR. Loading amounts with NSSK 1 and type of regeneration may be found in the legend [Measurements according to Example 4; NSSK=naphthalenesulphonic acid condensate].

On minimizing the amounts used of the compounds of the invention selected for the coating, by addition of salt, the take-up behaviour can be improved and thus a good desalting performance in the mixed bed can be achieved even with very low rates of addition.

Figure 3:
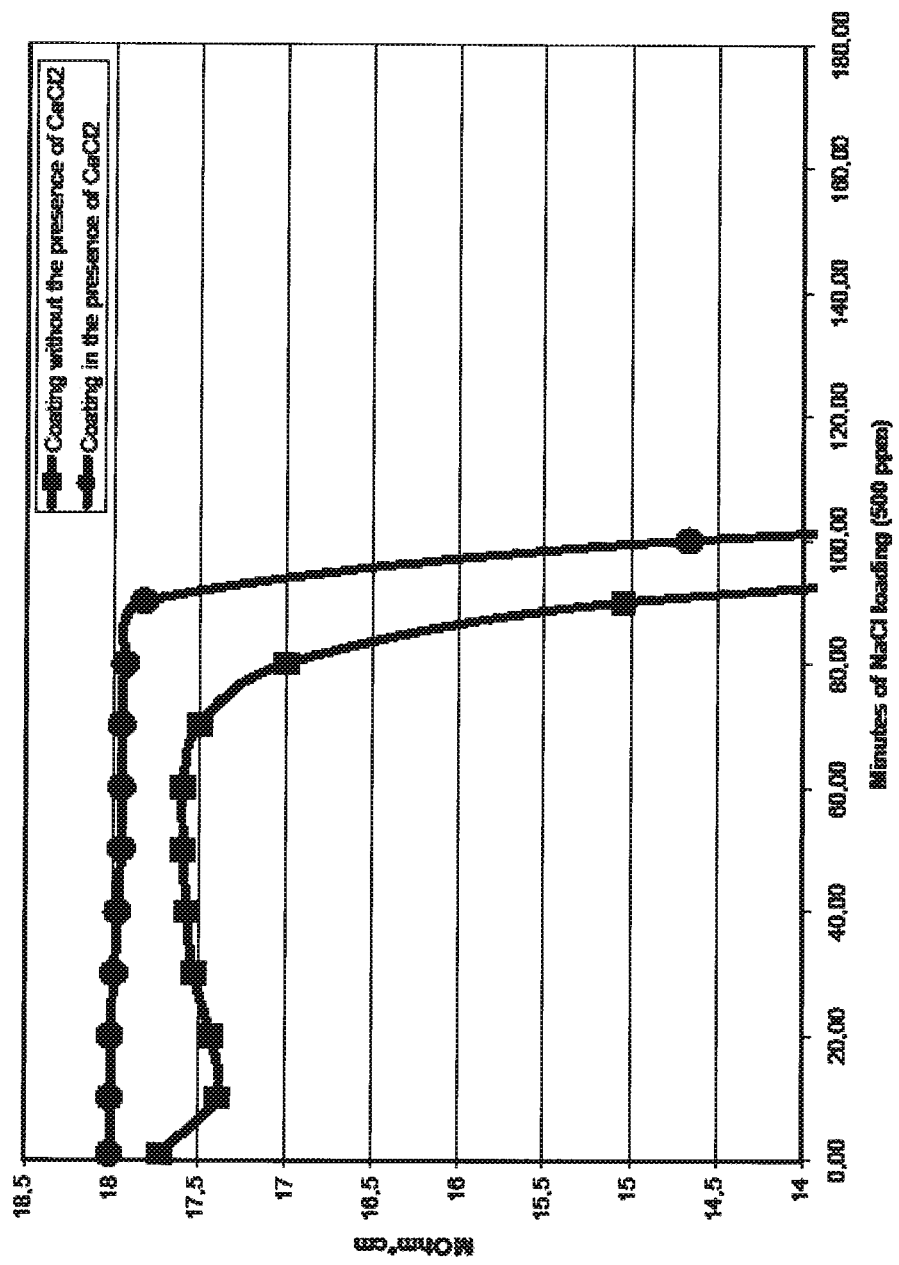
FIG. 3 provides a plot of the experimental results of resin samples which are identically treated with naphthalenesulphonic acid condensate with and without the presence of calcium chloride.

The action of calcium chloride addition on charging LEWATIT® MonoPlus M 800 with naphthalenesulphonic acid condensate 2 is shown impressively in FIG. 3: despite equally low usage of NSSK 2, the desalting performance of the sample produced in the presence of calcium chloride is markedly better than the "blank sample". No adverse effect on the alkaline earth metal salt used was observable at any time point.

Summary: Polyanion additions to anion exchange components in mixed beds are able to reduce the clumping effectively or prevent it completely with the effect that correspondingly treated mixtures more rapidly achieve the required resistance level in the eluate (or only such mixtures achieve this level at all) and have a higher usable capacity than corresponding mixtures without additive addition. In experiments, NSSK-treated mixtures demonstrated better measured values than PSS-treated comparisons.

The sole addition of the claimed compounds to the anion exchange component in mixed beds makes possible the effective separation in the upflow process for regeneration of the component.

FIG. 3 is a presentation of the experimental results of resin samples which are identically treated with naphthalenesulphonic acid condensate 2 of the same batch of LEWATIT® MonoPlus M 800 with and without the presence of calcium chloride (Example 5) in the mixed bed with LEWATIT® MonoPlus S 200 KR. The measurement, in a departure from the description in Example 4, was not performed with "raw water", but with sodium chloride solution (500 ppm).

What is claimed is:

1. A process for producing non-agglomerating readily separable mixed bed ion exchangers having an anionic exchange component and a cationic exchange component, or mixed bed components, comprising:
    treating the anion exchange component with a condensate in the application concentrations of 10 mg/liter of resin to 100 g/liter of resin, wherein the condensate is a product of the reaction of one or more naphthalenesulphonic acids with either an aldehyde or ketone; and
    mixing the anion exchange component with the cation exchange component, said mixing step occurring either before or after said treating step.

2. The process according to claim 1, wherein the naphthalenesulphonic acids comprise a methylene-bridged naphthalenesulphonic acid.

3. The process according to claim 1, wherein a polyanionic component is applied to the anionic exchange component in the batch.

4. The process according to claim 1, wherein the anionic exchange component is treated before regeneration of the anion exchanger and before mixing with the cationic exchange component.

5. The process according to claim 1, wherein the condensate has a molar weight of greater than 1000 g/I.

6. The process according to claim 1, wherein said treating step further comprises adding a salt.

7. The process according to claim 6, wherein the salt is an alkaline earth metal salt.

8. A process for producing a mixed-bed ion exchanger having both an anionic exchanger and a cationic exchanger, comprising:

providing a condensate that is a product of the reaction of one or more naphthalenesulphonic acids with either an aldehyde or ketone;

contacting said condensate with said anionic exchanger, and mixing the anionic exchanger with the cationic exchanger, thereby forming said mixed bed ion exchanger, and wherein said mixed bed ion exchanger is non-agglomerating and is readily separable.

9. The process according to claim 8, wherein said cationic exchanger is a strongly acidic cationic exchanger and wherein said anionic exchanger is a strongly basic anion exchanger.

10. The process according to claim 8, wherein said naphthalenesulphonic acids comprise a methylene-bridged naphthalenesulphonic acid.

11. The process according to claim 8, wherein the combined shaken under water volume of the mixed-bed ion exchanger is no more than 20% above the combined volume of the anionic exchanger with the cationic exchanger.

* * * * *